(12) United States Patent
Bos et al.

(10) Patent No.: US 8,558,919 B2
(45) Date of Patent: Oct. 15, 2013

(54) FILING DIGITAL IMAGES USING VOICE INPUT

(75) Inventors: Jeffrey Charles Bos, Waterloo (CA); Kem-Laurin Kramer, Guelph (CA)

(73) Assignee: Blackberry Limited, Waterloo (CA)

( * ) Notice: Subject to any disclaimer, the term of this patent is extended or adjusted under 35 U.S.C. 154(b) by 386 days.

(21) Appl. No.: 12/649,395

(22) Filed: Dec. 30, 2009

(65) Prior Publication Data

US 2011/0157420 A1   Jun. 30, 2011

(51) Int. Cl.
H04N 5/76   (2006.01)
G10L 21/00   (2013.01)
G10L 21/06   (2013.01)

(52) U.S. Cl.
USPC .................. 348/231.2; 348/231.3; 348/231.4; 348/231.99

(58) Field of Classification Search
USPC ..................... 348/231.99, 231.2, 231.3, 231.4
See application file for complete search history.

(56) References Cited

U.S. PATENT DOCUMENTS

| | | | |
|---|---|---|---|
| 6,101,338 A | 8/2000 | Bernardi et al. | |
| 6,278,968 B1 | 8/2001 | Franz et al. | |
| 6,335,742 B1 | 1/2002 | Takemoto | |
| 6,462,778 B1 * | 10/2002 | Abram et al. | 348/239 |
| 7,053,938 B1 * | 5/2006 | Sherry | 348/231.4 |
| 7,366,979 B2 * | 4/2008 | Spielberg et al. | 715/230 |
| 2003/0063321 A1 | 4/2003 | Inoue et al. | |
| 2003/0189642 A1 | 10/2003 | Bean et al. | |
| 2004/0041921 A1 * | 3/2004 | Coates | 348/231.2 |
| 2004/0119837 A1 | 6/2004 | Inoue | |
| 2005/0134703 A1 | 6/2005 | Mittal | |
| 2006/0174054 A1 | 8/2006 | Matsuki | |
| 2007/0236583 A1 * | 10/2007 | Vuong et al. | 348/231.99 |
| 2008/0033983 A1 * | 2/2008 | Ko | 707/102 |
| 2008/0159491 A1 | 7/2008 | Kelley et al. | |
| 2009/0157401 A1 | 6/2009 | Bennett | |

OTHER PUBLICATIONS

CBC News "Technology & Science—Software recognizes and describes images in words", http://www.cbc.ca/technology/story/2006/11/02/tech-imagetag-061101.html , Nov. 2, 2006.
Eric Franklin, "You speak and 'Shutter Voice' listens", http://news.cnet.com/8301-17938_105-10108943-1.html, Nov. 26, 2008.
Word.Tips.Net, "An Automatic File Name", http://www.word.tips.net/Pages/T001693_An_Automatic_File_Name.html, at least as early as Jun. 26, 2009.
Extended European Search Report issued in respect of EP Patent Application No. 09180945.9 dated Jul. 9, 2010.
Canadian Office Action dated Feb. 25, 2013 issued for corresponding Canadian Patent Application No. 2,726,391.

\* cited by examiner

*Primary Examiner* — John Villecco
*Assistant Examiner* — Dwight C Tejano
(74) *Attorney, Agent, or Firm* — Ridout & Maybee LLP

(57) ABSTRACT

Method and device for naming digital image data files stored on a camera enabled device having an image sensor, an audio sensor, a display and a memory, including: capturing image data through the image sensor; automatically displaying on the display a default filename for an image data file for the captured image data; monitoring the audio sensor for voice input upon detecting a user input selecting the default filename, and determining a new filename for the image data file in dependence on a text translation of the voice input. A folder name can alternatively be determined in dependence on a text translation of a voice input and an image data file for the captured image data saved in the memory using a folder having the folder name.

21 Claims, 10 Drawing Sheets

FILING DIGITAL IMAGES USING VOICE INPUT

TECHNICAL FIELD

The present disclosure relates to a device and method for storing digital images on a camera enabled device.

BACKGROUND

Users of digital camera enabled devices sometimes have difficulty locating specific photographs stored on the device. Long sequences of photographs are often named using a default, non-descriptive naming scheme that prevents users from easily locating specific photographic data files based on their content or the context in which they were taken. Although some devices allow users to rename these files using text input methods, or to view thumbnail images of a range of files, both of these methods can be cumbersome and time-consuming, especially on devices with limited data-processing or text-entry capabilities.

Some digital camera enabled devices also allow users to add voice annotations to a given photograph file using a microphone. However, these annotations must be played back to a user one at a time using the device speaker.

DETAILED DESCRIPTION OF EXAMPLE EMBODIMENTS

According to example embodiments is a method for naming digital image data files stored on a camera enabled device having an image sensor, an audio sensor, a display and a memory, including: capturing image data through the image sensor; automatically displaying a default filename on the display for an image data file for the captured image data; monitoring the audio sensor for voice input upon detecting a user input selecting the default filename; and determining a new filename for the image data file in dependence on a text translation of the voice input.

A camera enabled device including: an image sensor for capturing image data; a memory for storing image data files corresponding to captured image data; an audio sensor for receiving voice input; a display; a user input device; a processor coupled to the memory, image sensor, audio sensor, display, and user input device, wherein the processor is configured to: after image data is captured using the image sensor, automatically display on the display a default filename for an image data file for the image data; and upon detecting input through the user input device selecting the default filename, activate the audio sensor to receive voice input, determine a new filename in dependence on a text translation of the voice input, and use the new filename to identify the image data file in the memory.

A method for organizing digital image data files stored on a camera enabled device having an image sensor, an audio sensor, a display and a memory, comprising: capturing image data through the image sensor; receiving voice input through the audio sensor and determining a folder name in dependence on a text translation of the voice input; and saving an image data file for the captured image data in the memory using a folder having the folder name. A camera enabled device configured for performing this method is also disclosed.

This document describes a device and method for storing digital image data. In some embodiments, digital image data generated by a digital camera enabled device is stored in an electronic file system as individual files, with one still photograph or video stored in each file. In some example embodiments one or both of the name of the digital image files and the name of a file folder containing the digital image files can be set by a user by employing a speech recognition system using voice input.

Figure 1:
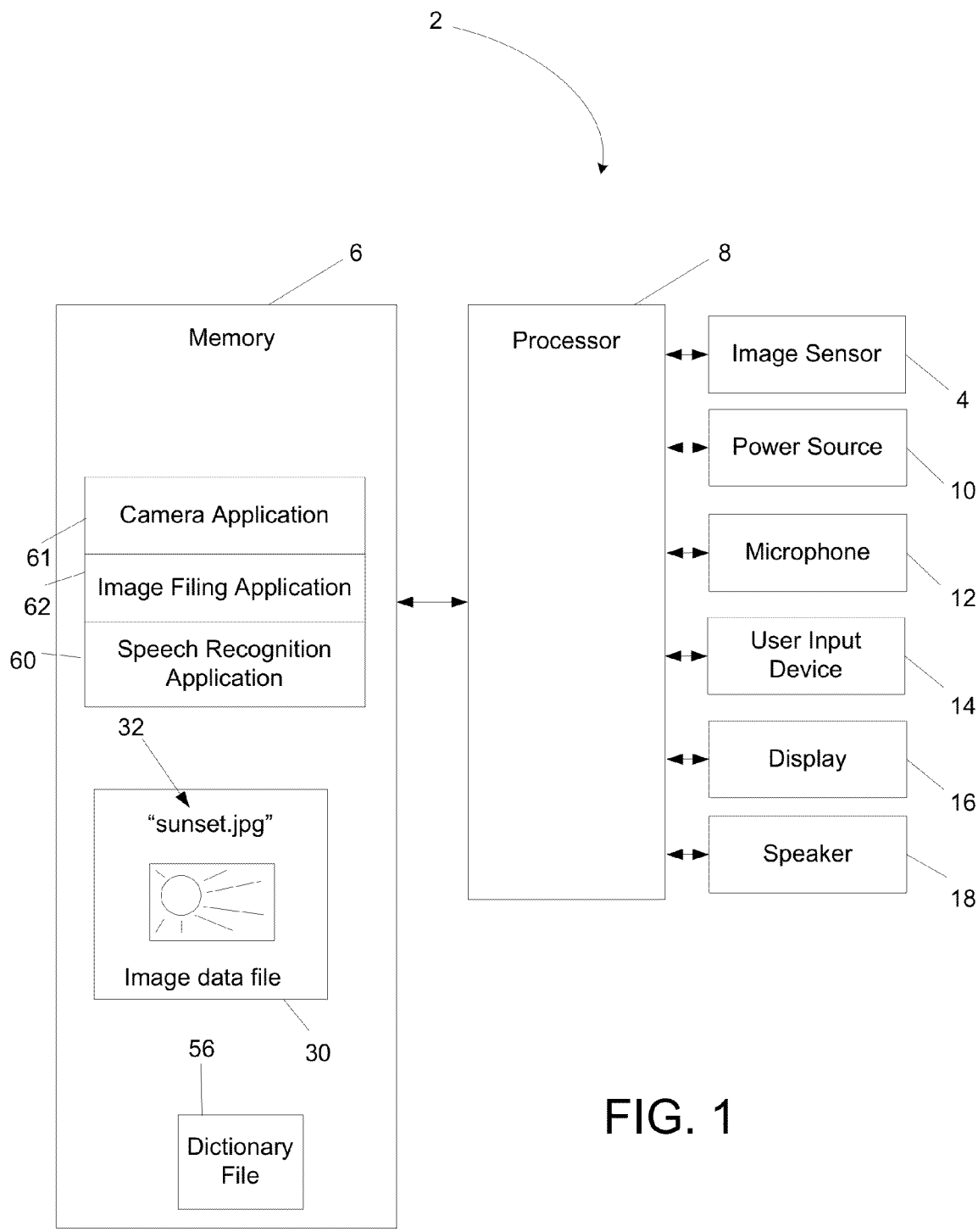
FIG. 1 is a block diagram showing an example embodiment of a camera enabled device to which example embodiments of image naming systems described herein can be applied.

An example embodiment illustrated in FIG. 1 includes a camera enabled device 2 for capturing and storing digital image data that may include photographs or video. The camera enabled device 2 may take the form of a dedicated digital camera or video camera, or be a multi-use device such as camera enabled smart phone, personal digital assistant, or a laptop or desktop computer with an attached digital imaging device such as a camera or scanner, or any other device capable of generating digital image data and storing the data in an electronic file system. In at least one example embodiment, camera enabled device 2 is a camera equipped smart phone that can capture digital and video images and is also enabled for voice and data communications over a wireless network. The following description of example embodiments of the camera enabled device 2 may include some optional features or elements and may omit others.

The camera enabled device 2 has an image sensor 4 configured to generate digital image data. The image sensor 4 may include a conventional optical sensor for capturing digitized image data, or may be some other digital imaging device. The image sensor 4 operates by capturing visual data from the environment using photosensitive electronic elements and transmitting or storing this data as digital image data using other components of the camera enabled device 2.

The camera enabled device 2 has a storage element or memory 6 for storing data. This memory 6 may include volatile or non-volatile digital storage elements, or both. In some embodiments, the memory 6 includes flash memory for long-term storage and RAM for working memory.

The camera enabled device 2 has a processor 8 for controlling its operation and which is operational to read and write data in the memory 6 and to execute various operational modules of the camera enabled device 2. In some embodiments, this processor 8 comprises one or more digital microprocessors.

In addition, the camera enabled device 2 has a power source 10 providing electrical power to the various components. In some embodiments, the power source 10 includes a rechargeable battery. The camera enabled device 2 also has an audio sensor such as microphone 12 configured to collect audio data from the environment. More specifically, the microphone 12 collects audio data for use by various components of the camera enabled device 2 such as processor 8, which may translate this data into digital audio data and perform other operations upon it.

In some embodiments, the microphone 12 is built in to the camera enabled device 2, while in others it may be removable and attachable by an electrical connector or other communications link including for example a wireless Bluetooth™ link. The camera enabled device 2 has at least one user input device 14, including for example one or more of a keyboard, keypad, scrollwheel, trackball, trackpad, mouse, or touchscreen. Each user input device 14 is operable by a user to provide input to the camera enabled device 2, such as alphanumeric data from a keyboard or keypad, or pointer and selection data from an on-screen navigation device. In some embodiments, the microphone 12 may replace or supplement the other user input devices 14 by allowing the user to operate the camera enabled device 2 using voice commands.

The camera enabled device 2 has a display 16, such as an LCD display screen, for presenting visual information to a user. The camera enabled device 2 also has a speaker 18 for presenting audio output to a user.

The processor 8 is operable to execute various operating system software and other software applications stored in the memory 6 that configure the processor 8 to implement various operational modules of the camera enabled device 2.

In example embodiments, a camera application 61 present in memory 6 configures the processor 8 to facilitate the taking and storage of image data using the image sensor 4 and other device resources. In example embodiments, an image filing application 62 and a speech recognition application 60 (which may, in various embodiments, be parts of the same application or be parts of camera application 61 or be separate applications) are executed by the processor 8 to allow the image filing and naming functionality described herein.

In one example embodiment, the speech recognition application 60 configures the processor 8 to implement a speech recognition module. The speech recognition module is configured to receive audio data gathered by the microphone 12 and, where this audio data comprises voice input, translate the voice input into text corresponding to the content of the voice input. The speech recognition module may perform this translation according to any of a number of conventional speech recognition algorithms. In one example embodiment, the speech recognition module operates according to a speaker-independent speech recognition algorithm, although alternative embodiments could make use of speech recognition configured for a specific user.

In some example embodiments, applications such as camera application 61, image filing application 62 and speech recognition application 60 can be stored on a computer readable medium that is separate from the camera enabled device 2 and then downloaded or otherwise transferred to the memory 6 of the camera enabled device.

Figure 2:
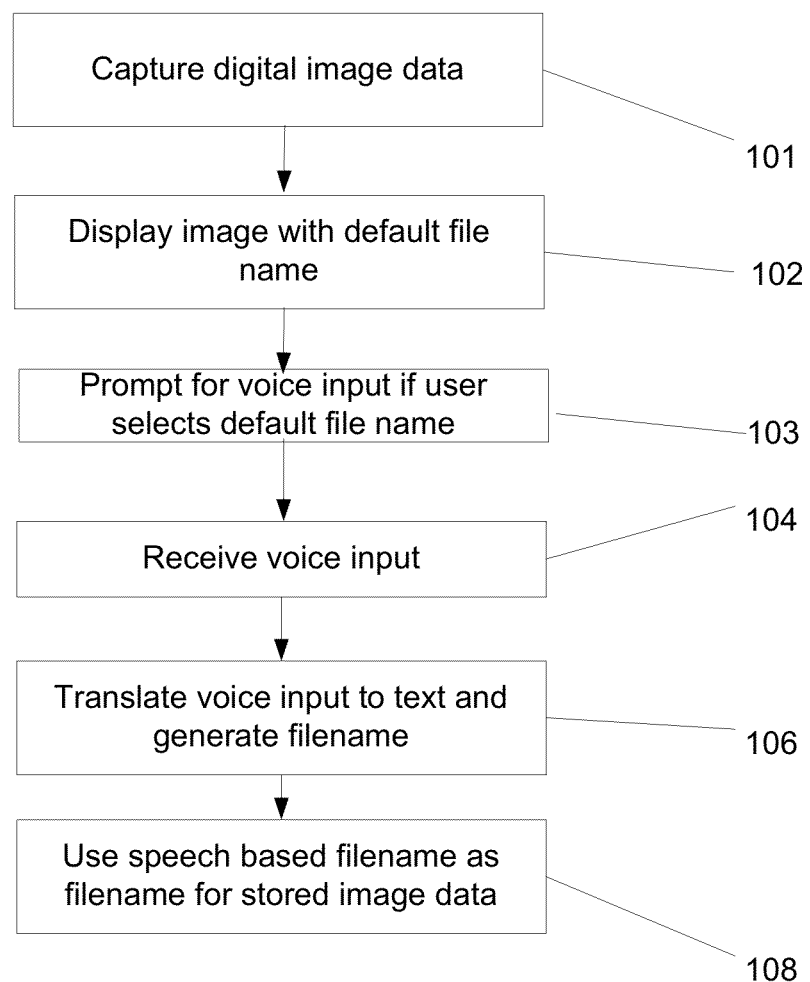
FIG. 2 is a flow diagram illustrating a digital image file naming method applied to the camera enabled device of FIG. 1 according to example embodiments.
Figure 3:
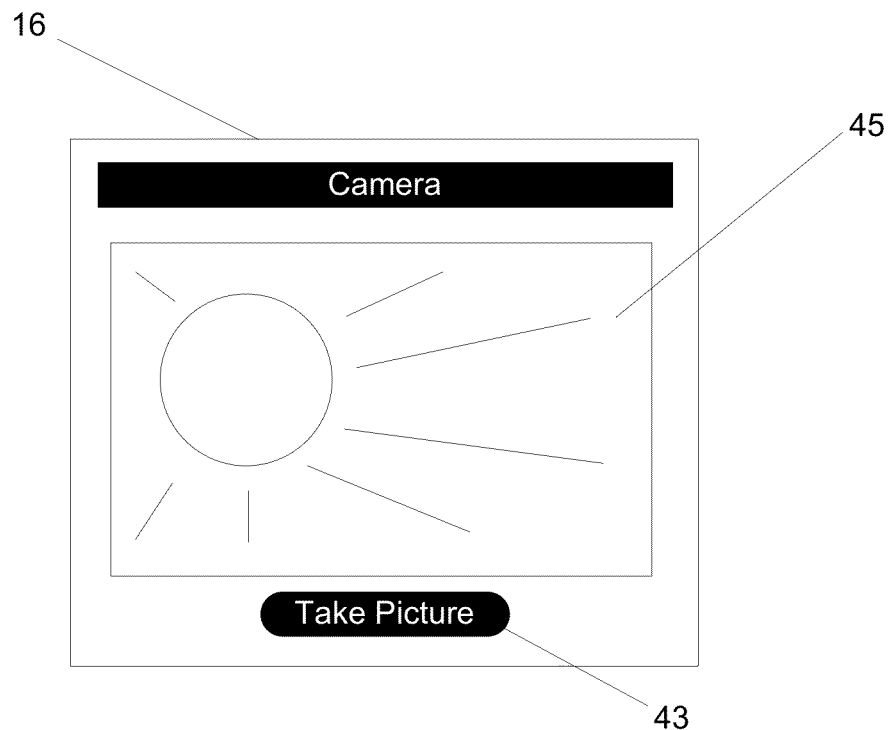
FIGS. 3 to 6 show representations of user interface screens displayed on the camera enabled device of FIG. 1 according to example embodiments.

An example of operation of the camera enabled device 2 under control of the camera, image filing and speech recognition applications 61, 62, 60 will now be described with reference to FIGS. 1 to 7. Although the following description focuses on capturing a still image, the naming systems described herein can also be applied to video image files. Referring first to FIG. 3, such Figure illustrates a user interface screen presented on display 16 when the camera enabled device 2 operates in an image capture mode, for example in a camera ready mode. When implemented in a smart phone, the camera enabled device 2 could for example launch or otherwise activate or open camera application 61 to enter the camera ready mode in response to a predetermined user input or inputs. In camera ready mode, a real-time image 45 based on image data received from the image sensor 4 is displayed on the display 16, and the user is presented with the option of taking a picture through a user input action such as selecting an on-screen item such as a "Take Picture" button 43. Depending on the configuration of the camera enabled device 2, predetermined user input actions could trigger taking of a picture, including for example depressing a dedicated physical button on the camera enabled device 2 or providing a predetermined voice input, among other things. Referring to FIG. 2, as indicated in actions 101 and 102, once a user input requesting that a picture be taken is received, digital image data representing still photo image data is captured from the image sensor 4, automatically assigned a default filename 33, stored in memory 6 and displayed on the display 16. The automatically-generated default filename 33 may be generated according to some default photograph naming scheme: e.g., the name may comprise a standard prefix (such as "Photo" or "Picture" or "Pic") followed by an index or counter incremented each time a new photograph file is stored, followed by the file type extension (e.g. ".jpg" or ".tiff"), resulting in a sequence of default filenames such as "Pic001.jpg", "Pic002.jpg", and so on.

Figure 4:
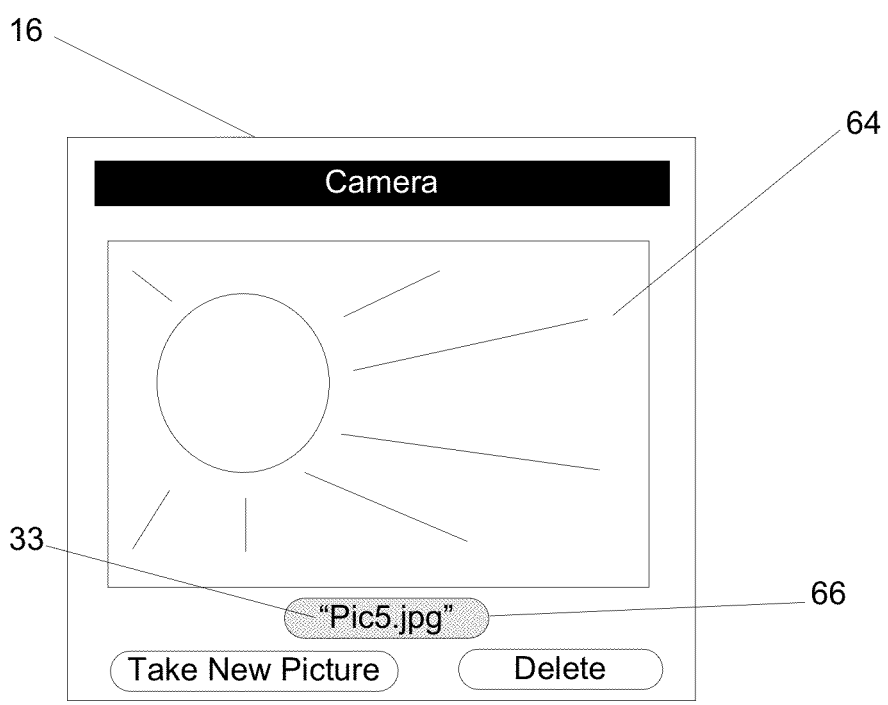
Figure 5:
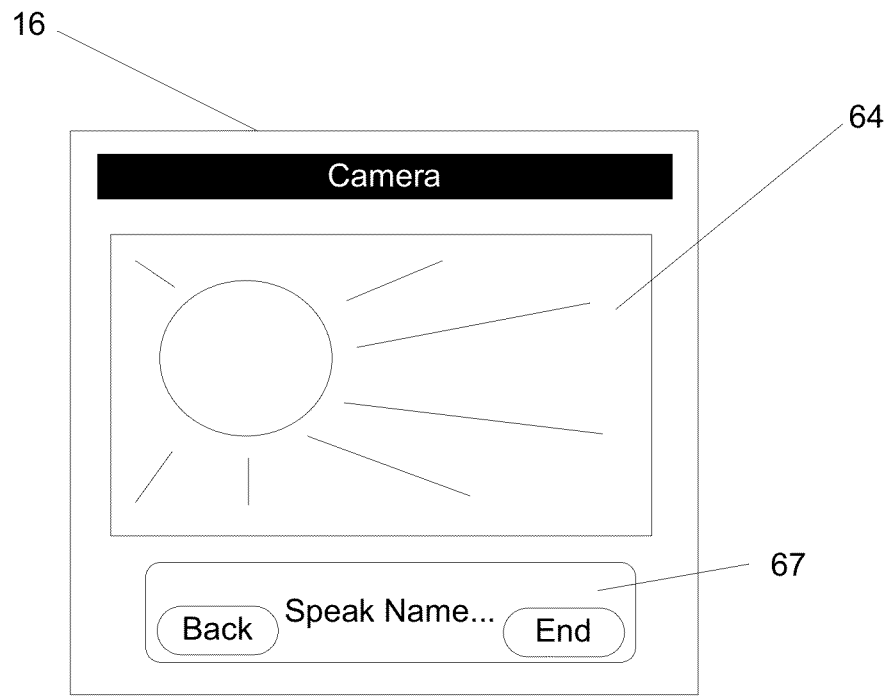

Referring to FIG. 4, immediately after the digital image data is captured, the captured still image 64 that represents the captured digital image data is displayed on the display 16 along with the default filename 33 for at least a predetermined duration. In some example embodiments, user selectable buttons representing functions such as "take a new picture" or "delete" are displayed along with the captured image 64 and the default filename 33. In some example embodiments, in the absence of any further user input the captured image 64 will be displayed for a default duration before the camera enabled device 2 automatically reverts back to the camera ready photo-taking mode user interface screen of FIG. 3. In at least some example embodiments, during the time that the captured image 64 and default filename 33 are being displayed subsequent to a picture being taken as shown in FIG. 4, the user can highlight or focus and then select the default filename 33 displayed on the display 16 by using an onscreen marker 66 (which may for example be a cursor or caret other onscreen navigational indicator) that is controlled by one or more of a trackball device, touch screen input, or other user input as determined by the capabilities of the camera enabled device 2. As indicated by action 103, once a user input is received selecting the default filename 33, the user is automatically prompted to provide a voice input to rename the digital image file. As represented in FIG. 5, a prompt could be a visual prompt 67 displayed on screen 16 to the user, or it could be an audio prompt or vibratory prompt or combinations thereof.

Once a user input has been received indicating that the user desires to rename the default filename 33 using voice input, the microphone 12 is activated and monitored for voice input from the user (action 104, FIG. 2). The processor 8 translates the voice input gathered by the microphone 12 into text. This text is used to generate a new voice input derived filename 32 (FIG. 1) based on the text translation of the voice input to replace the default filename 33 (action 106, FIG. 2). As indicated at action 108, and graphically represented in FIG. 1, the digital image data file 30 for the captured image 64 is stored in memory 6 using the new voice input derived filename 32. The digital image data file 30 for example could be stored under the new voice input derived filename 32 in flash memory of the memory 6. In an example embodiment, once the digital image data file 30 is stored under the new filename 32, the processor 8 may return to the camera ready photo-mode user interface of FIG. 3. In some example embodiments, the actual digital image data stored in actions 101 and 102 is simply renamed in action 108, rather than creating a new image data file. In other example embodiments a new image data file is created in action 108 under the new filename 32.

Figure 6:
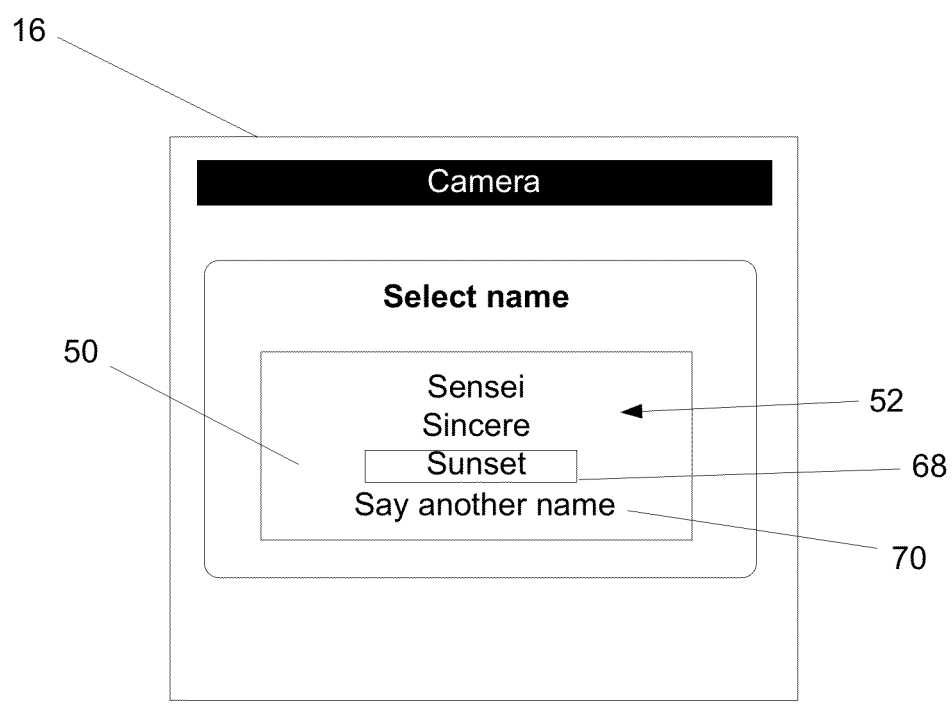
Figure 7:
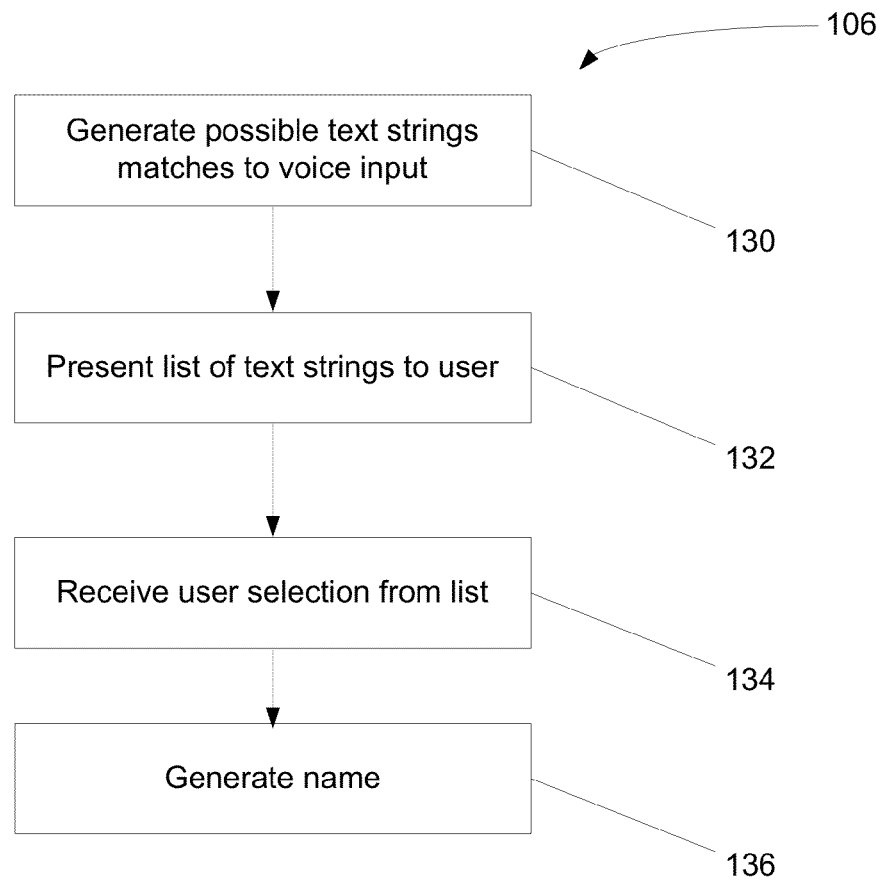
FIG. 7 is a flow diagram illustrating a voice translation routine applied to the camera enabled device of FIG. 1 according to example embodiments.

Voice translation and filename creation action 106 will now be described in greater detail according to one example embodiment. In this regard, FIG. 7 is a flowchart showing the operation of the processor 8 to translate the voice input received from the user through microphone 12 into text, and FIG. 6 represents an example of a user interface screen shown on display 16 during speech translation. At action 130, a speech recognition algorithm is applied to the digital audio data representing the voice input, generating one or more text strings as possible matches for the voice input. The speech recognition algorithm may be assisted in its operation by a dictionary file 56 (FIG. 1) stored in the memory 6. This dictionary file 56 may contain a list of words or other text strings or other predetermined rules to provide the speech recognition algorithm with a universe of possible text translations for any voice input, with any translation including one or more of the words concatenated together, and potentially with other operations performed upon them (such as pluralisation, capitalization, separation using separator characters, and so on).

At action 132, the text strings 52 are assembled into a list 50 and presented to the user on the display 16 (see FIG. 6) or through some other mechanism, such as re-translating them to audio data using a text-to-speech system and presenting the audio data to the user via the speaker 18. The text-to-speech system used in the latter example could make use of any of a number of conventional text-to-speech algorithms, or it could use a stored library of pre-recorded audio segments matching a lexicon of text strings.

At action 134, the user is allowed to choose one of the text strings 52 from the list 50 and select the choice through using an on-screen marker 68 controlled by a user input device 14. As indicated in action 136 of FIG. 7, once the user selects one of the text strings 52, the new filename 33 is generated based on the selected text string. As shown in FIG. 6, in some example embodiments the list 50 may include a user selectable option 70 to "say another name". If the user selects the "say another name", then the processor returns to action 103 and displays the user interface of FIG. 5.

The file-naming scheme implemented by the processor 8 may in example embodiments perform various operations, according to a predetermined set of rules, on the text translation of the voice input to generate the final filename 32. For example, the filename 32 may be a lengthened or shortened version of the text translation. One example file-naming scheme using text translation of voice input can name the digital image file 30 using the text translation, shortened to a predetermined maximum character length (e.g. 8 characters), with additional suffixes denoting an index and a file type extension, resulting in a filename 32 such as "sunset001.jpg" when given "sunset" as the text translation of the voice input. If given a longer text translation, such as "family vacation", the resulting filename 32 might be "family_v001.jpg". In some embodiments, the naming scheme might perform additional transformations or omit one or more of the suffixes or the abridgement—e.g., the example shown in FIG. 1 simply appends the file type extension ".jpg" to the text translation "sunset" to produce the filename 32 "sunset.jpg".

In at least some example embodiments, during text conversion and filename generation action 106 (for example during one or both of actions 130 or 136) conflict checking is performed to compare the spoken filename with existing filenames used for existing image data files stored in memory 6, to determine if the spoken filename duplicates all or a major part of a previously used filename. For example, if "sunset" is the spoken input, and the filename "sunset.jpg" is already associated with a digital image date file 30 stored in memory 6 then a potential naming conflict exists. In an example embodiment where such conflict checking is performed in action 136 after the user has selected one of the text strings 52, the processor 8 may be configured to automatically add a distinguishing identifier such as a suffix to the selected text string—for example if a file named "sunset.jpg" or "sunset1.jpg" already exists, the second text string "sunset" might be automatically changed to "sunset2.jpg" or "sunset002.jpg" in action 136. In such case, the distinguishing identifier is the next number in a sequence of numbers. In some embodiments the distinguishing identifier could for example be one or both of a time or date stamp corresponding to when the picture was taken—for example "Sunset_837PM_062209". In some example embodiments, time and date stamps or other unique identifier may automatically get added to all text strings in action 136 such that all digital image files are saved with filenames that include date and time information or another unique identifier, thereby greatly reducing any chance of a future naming conflict.

Figure 8:
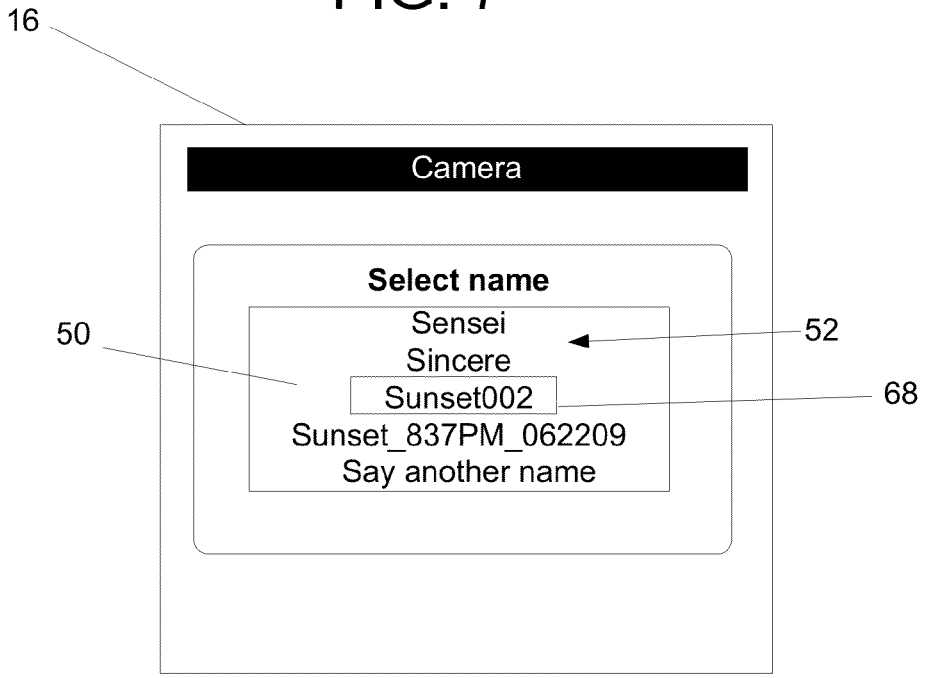
FIGS. 8 to 10 show representations of user interface screens displayed on the camera enabled device of FIG. 1 according to example embodiments.

In some example embodiments potential naming conflict checking is done in action 130 by comparing each of the text strings 52 with existing filenames used in memory 6, and then automatically adding a distinguishing identifier to the affected text strings 52 shown in the list 50. In this regard, FIG. 8 shows an example of a user interface screen shown on display 16 as a result of "present list of text strings" action 132 according to an example embodiment. In the example of FIG. 8, the processor 8 has detected a filename conflict with the text string "sunset" and has added the unique sequential numerical identifier "002" resulting in the user selectable text string "Sunset002". In some example embodiments, alternative text strings with automatically generated unique identifiers may be presented in list 50 as represented by time and date stamped text string "Sunset_837PM_062209" in FIG. 8. Thus, in the example of FIG. 8, the user can select either "Sunset_2" or "Sunset_837PM_062209" as the text string to use in a filename. In the example of FIG. 8, the user is also given the option to "say another name" in the event that none of the presented options are desired.

Accordingly, pursuant to the image file naming system embodiments represented in FIGS. 1-8, once digital image data is captured by camera enabled device 2, a default filename is associated with the digital image data and displayed on a display of the device. If the user selects the displayed default filename, the user is prompted to provide verbal input. A text string is derived from the verbal input, and a new filename for the digital image data is determined in dependence on the derived text string.

Figure 9:
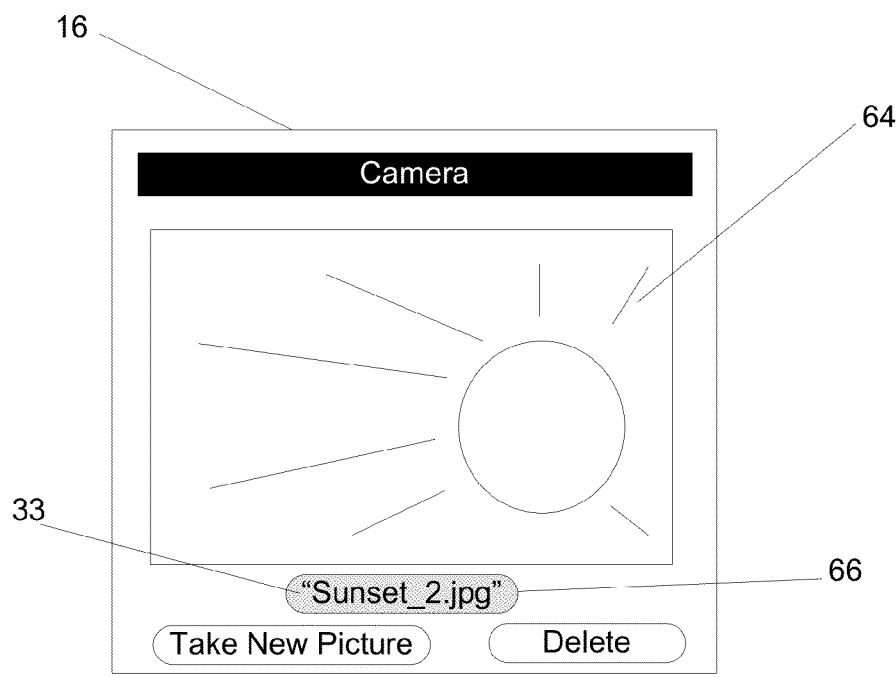

In some example embodiments, the processor 8 is configured in action 102 to automatically generate a default filename derived from the last filename 32 used for the most recently stored digital image file—for example, a unique sequential identifier can be added to the filename 32 used for the most recently stored digital image file. An illustration of such embodiment will be explained with reference to FIG. 9, which shows an example of a user interface screen shown on display 16 immediately after data representing still image 64 has been captured as part of action 2. In the example shown in FIG. 9, the previously taken picture has been stored using the filename "Sunset.jpg", which could for example have been based on spoken input by the user. When the default file name for the next captured image, which is shown in FIG. 9, is generated, the sequential identifier "2" is automatically added to the filename, resulting in the default filename "Sunset_2.jpg" 33. The user can override the default name by selecting it (for example by using selection marker 66) in which case the user interface of FIG. 5 will appear prompting the user to input by voice a new filename. Alternatively the user can accept the default filename 33 by taking some predetermined action or in some example embodiments by taking no action for a predetermined duration, in which case the image will be saved in memory 6 under the default name 33. Accordingly, in some example embodiments, image file names are automatically derived based on verbal input received in respect of previously captured images.

Figure 10:
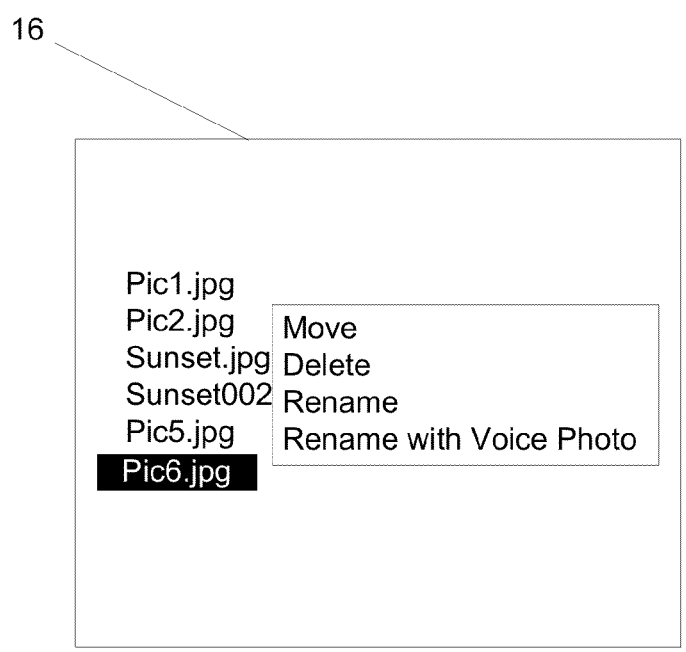

In some example embodiments, voice input can also be used to rename previously saved image files. For example, FIG. 10 shows an example of a user interface screen on display 16 that includes a list of filenames associated with data image files stored on memory 6. User selection of one of the displayed filenames causes processor 8 to display a menu list of user selectable options such as "Move"; Delete"; "Rename"; "Rename with Voice Photo". User selection of the "Rename with Voice Photo" option results in execution of actions 103 to 108 described above.

In some example embodiments, verbal input may be used to name the folders in which image files are stored, in addition to or in place of using verbal input to name the file folders themselves. In this regard, FIGS. 11-15 illustrate an embodiment in which voice input is used to identify folder names for storing image data. In the example represented in FIG. 11, text translation of voice input has been used to name a file folder 36. Digital image data files 30 are stored in the folder 36 in memory 6 (such as flash memory storage element component of memory 6). In the example shown in FIG. 11, the folder 36 is stored in a hierarchical folder structure in the location "/files/photos/", with the name of the lowest level folder 76 being named "sunset" based on the text translation of voice input, resulting in a folder path 35 of "/files/photos/sunset/" for the files 30 containing digital image data. The names 32 of the image files 30 may be determined in a number of different ways in various example embodiments. For example, the filenames may be derived from the voice inputted folder name with a sequential identifier or date stamp appended to the name. In the example shown in FIG. 11, the processor has generated the folder name "sunset" based on voice input, and then generated default file names "sunset_1.jpg" and "sunset_2.jpg" for use as filenames for image data files that are stored in the folder "sunset".

Figure 11:
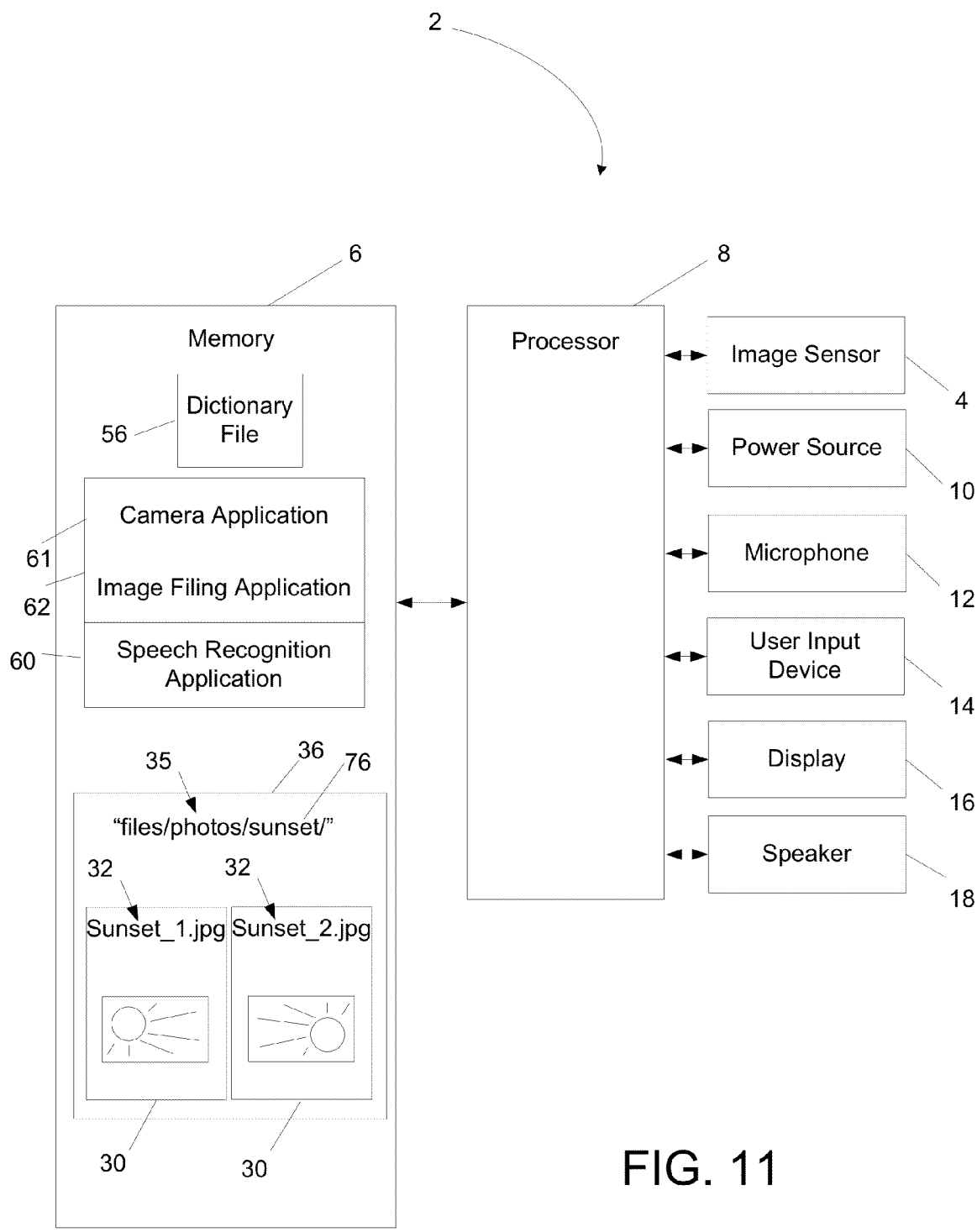
FIG. 11 is a block diagram showing the camera enabled device of FIG. 1 with an example embodiment of an image folder naming system applied thereto.
Figure 12:
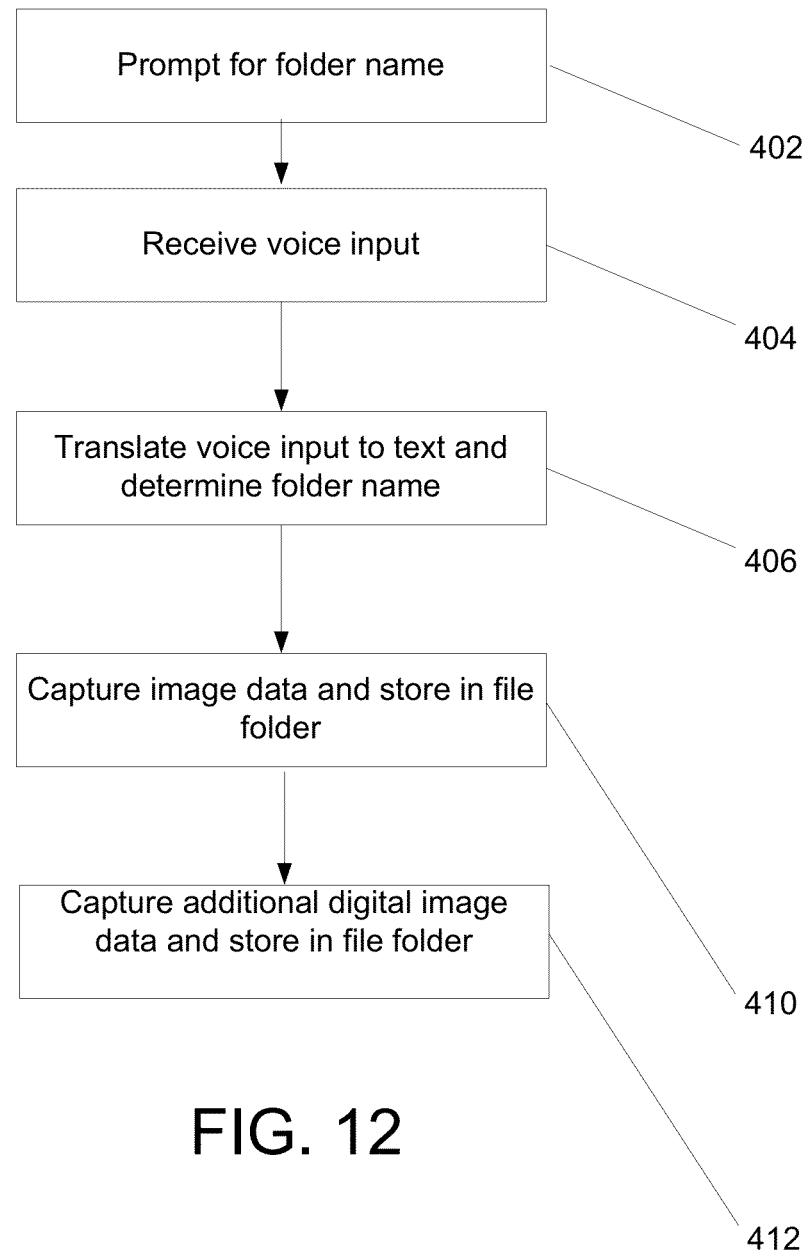
FIG. 12 is a flow diagram illustrating a digital image folder naming method applied to the camera enabled device of FIG. 11 according to example embodiments.
Figure 13:
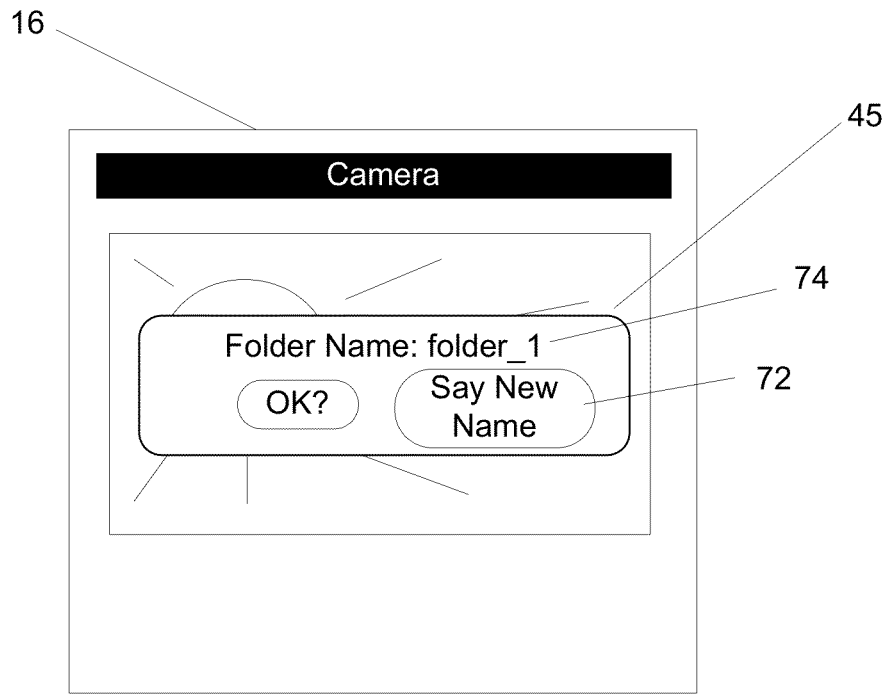
FIGS. 13 to 16 show representations of user interface screens displayed on the camera enabled device of FIG. 11 according to example embodiments.

The flowchart of FIG. 12 illustrates an example embodiment of actions implemented by processor 8 during a file folder naming process that results in the file folder shown in FIG. 11. In one example embodiment, when the camera enabled device 2 first enters an image capture mode (for example through a user action that launches, opens or otherwise activates the camera application 61), the user is prompted to verbally provide a folder name for storing the digital images that are subsequently taken (action 402). By way of example, FIG. 13 illustrates an example of an embodiment in which the processor 8 selects a default folder name 74 "folder_1" and displays the default folder name 74 as part of a user interface screen displayed on the display 16. The default folder name 74 could be determined according to a number of different criteria. By way of non limiting example, the default folder name 74 could be the most recent folder name used by the processor 8 to store digital image data (including a previously spoken folder name), or it could be a pre-configured name, or it could be a name that includes a previously used name combined with a unique identifier added to it such as a sequential identifier or one or both of a date or time stamp.

In the example illustrated in FIG. 13, the user is given an option to provide voice input to replace the default folder name 74. For example, the interface screen could include a user selectable option 72 in the form of a button or icon, or the user could be provided with the option to highlight and select the default folder name 74 "folder_1" using an on-screen navigation or user input device. Upon receiving a user input indicating that the user wants to provide a voice input for a folder name, the processor 8 causes a prompt to be issued to the user to say a folder name—by way of example user prompts as discussed above in respect of FIG. 5 could be used. The camera enabled device 2 could be configured to use the default folder name 74 if a user input is not received within a predetermined time duration, or alternatively to automatically provide a prompt for voice input if a user input is not received within a predetermined time period.

When prompting the user for voice input, the microphone 12 is activated to receive voice input from the user (action 404, FIG. 12). The processor 8 translates the voice input gathered by the microphone 12 into text that is then used to determine a folder name 76 based on the text translation of the voice input (action 406, FIG. 12). Speech to text translation can for example be performed in a manner similar to that described above in respect of filename generation—for example, with reference to FIGS. 7 and 14, a speech recognition algorithm is applied to the digital audio data representing the voice input, generating one or more text strings as possible matches for the voice input action 404. The speech recognition algorithm may be assisted in its operation by the dictionary file 56 stored in the memory 6 in the same manner as discussed above. At action 132, the text strings 52 are assembled into a list 50 and presented to the user on the display 16 (see FIG. 14) or through some other mechanism, such as re-translating them to audio data using a text-to-speech system and presenting the audio data to the user via the speaker 18. The text-to-speech system used in the latter example could make use of any of a number of conventional text-to-speech algorithms, or it could use a stored library of pre-recorded audio segments matching a lexicon of text strings.

Figure 14:
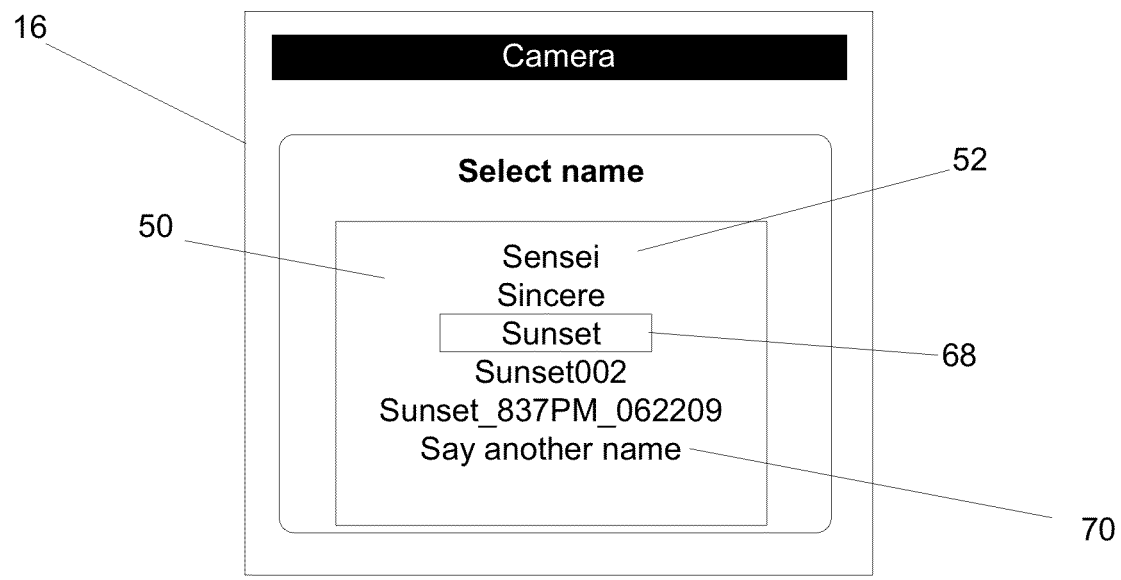

At action 134, the user is allowed to choose one of the text strings 52 from the list 50 and select the choice by, for example, using an on-screen marker 68 controlled by the user input device 14. As shown in FIG. 14, in some example embodiments included in the list 50 is a user selectable option 70 to "say another name". If the user selects the "say another name" option, then the processor returns to action 402 and displays a user interface similar to that of FIG. 5. As indicated in action 136 of FIG. 7, once the user selects one of the text strings 52, a folder name 76 is determined based on the selected text string.

The folder-naming scheme implemented by the processor 8 may in example embodiments perform various operations, according to a predetermined set of rules, on the text translation of the voice input to generate the final folder name 76. For example, the folder name 76 may be a lengthened or shortened version of the text translation according to predetermined rules. In at least some example embodiments, during text conversion and folder name determination 406, conflict checking is performed to compare the spoken folder name to existing folder names used for existing image data files stored in memory 6, to determine if the spoken folder name duplicates a previously used folder name. In some example embodiments, if the folder name already exists, the user will be presented with an option to use the existing folder name (in which case image data files corresponding to newly taken images will be stored with older data image files already stored in the specified file folder), or to verbally input a new folder name. In some example embodiments, if the voice-inputted folder name is already in use, the user may be presented with a further option to select an automatically generated variation of the folder name—for example the spoken name with a unique identifier such as a date stamp or a sequential identifier appended thereto. For example, referring to FIG. 14, if "sunset" is the spoken input, and the folder name "sunset" is already in use in memory 6, then a potential name duplication conflict exists and the user is presented with the option to proceed with storing new image data files in the folder "sunset" or to use a new folder "sunset002" (spoken name with sequential identifier appended) or to use a new folder "sunset-877PM_062209" (spoken name with date and time stamp identifier appended) or to "Say another name". In some example embodiments, the automatically generated variation of a previously used folder name will only be presented if predetermined conditions are met—for example if a threshold time period has passed since image data was last saved to the previously used folder name, or if the previously used folder name has not been used during the most recent activation of the camera application 61

Figure 15:
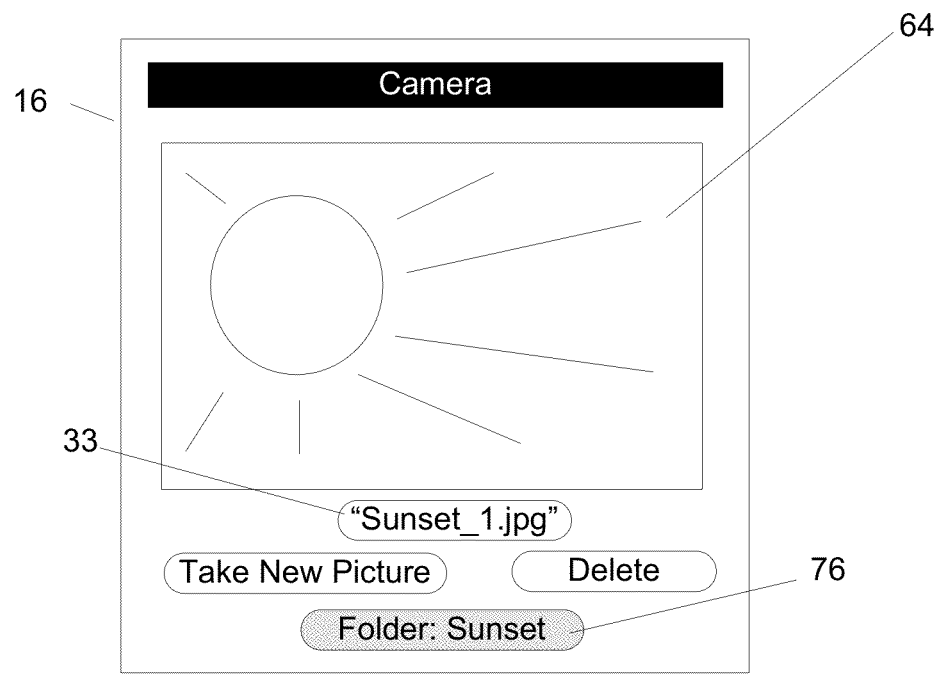

Once a folder name is determined in action 406, one or more image data files for subsequent images captured using the camera enabled device 2 are stored in the file folder (action 410). If the folder name is new, a folder is created in memory 6 for storing such images. Referring to FIG. 15, in an example embodiment, immediately after an image 64 is captured and as part of action 410 a representation of the image is automatically displayed on display 16 together with the new filename 33 for the image, as well as the folder name 76 of the folder that is currently set as the default folder for storing image data files. As noted above, the new filename 33 can in at least some example embodiments be automatically derived from the spoken folder name. In the example of FIG. 15 the user can be given another option to change the folder name 76 by providing a predefined user input such as, for example, highlighting and selecting the folder name on the display 16 using a user input device, in which case the user is prompted to verbally input another folder name and actions 402-406 are repeated. In the example of FIG. 15, the processor 8 can also be configured to allow a user to verbally specify the new filename 33 if the user selects the new filename 33 on the display screen 16 (thereby triggering actions 103-108).

As indicated in action 412, in some example embodiments, once a folder name has been set, the processor 8 keeps storing image data files for subsequently taken images in that same path 35 until a new folder name is specified using the option available on the user interface screen of FIG. 15 or through some other means.

In some example embodiments in which voice inputted folder names are used, the camera enabled device 2 may not prompt a user to enter a folder name prior to taking a picture after the camera application is opened or activated. Rather, receiving voice input (action 404) and translating the voice input to determine a folder name (action 406) could be performed immediately after an image is captured. For example, the user interface of FIG. 15 could be shown after the first image data is captured subsequent to the camera application 61 being opened, with a default folder name being displayed. Upon user selection of the default folder name, the user is then given the opportunity to input a new folder name using voice input in the manner described above.

In some example embodiments, once a folder name is voice inputted that folder name is used for all subsequent images until a user changes it.

Figure 16:

Accordingly, FIGS. 11 to 15 illustrate an example embodiment in which image files can be organized by verbally inputted folder names, thereby facilitating easier retrieval of image files at a future time. FIG. 16 illustrates an example user interface shown on display 16, in which the file folders that store image files are organized in a list. The user can select individual folder names from the list to view a list of the image data files stored therein. In example embodiments, a voice input can be used to provide new folder names for the listed folders.

The user input device 14 has been described in terms of various user input devices, as well as user output devices including a display and/or a speaker. However, one or more of the user output functions of the devices and methods described could be carried out using other forms of user output, including any visual, auditory, tactile, or other sensory media of communication. Furthermore, the user input devices described above are not meant to limit the scope of the disclosure, and the device may include any of a number of user input devices of various types usable alone or in combination to provide the user inputs described above.

The camera enabled device described above may take other forms in various alternative embodiments. It may be an optical scanner or another optically-sensitive electronic element. In some embodiments, the methods and devices described above could be applied to non-photographic data, such as sound recordings or data captured from other sensors or inputs. Many of the alternative behaviours and methods described above may be configurable as options on a single device.

While the applications described above, such as the speech recognition application 60, camera application 61 and image filing application 62, are described in the context of digital software applications loaded from a storage memory into a working memory and executed by a processor, they are not intended to be limited to this context, but are capable of embodiment by any electronic or logical components implementing the described methods.

Similarly, although the digital image data is described as including discrete files representing individual still photographs stored in the memory, many alternatives embodiments are possible. An individual file could represent multiple still photographs or video data. The files need not be stored in a hierarchical folder structure. In some embodiments, the digital image data could be stored as memory segments indexed in a database or other data structure, with the name of the location stored as a field in the database record. Any system for storing digital image data in named locations may be used in implementing the above-described methods and devices.

In some embodiments, the microphone 12 may be replaced by some other audio input. This audio input may receive analog audio data which is translated to digital audio data by an audio subsystem of the camera enabled device 2, while in other embodiments the audio input may receive digital audio data.

It will be appreciated that in at least some example embodiments the filename and folder name determining systems disclosed herein allow a user to name or organize image files in such a manner that the user can locate image files stored on the camera enabled device 2 quickly and efficiently. In at least some circumstances, this can be beneficial not only for a user of a device but also to the operation of the camera enabled device 2 since it may reduce user input events which may otherwise be required to identify and find stored images. In some cases, a reduction of user input events may reduce possible damage to and extend the life of the user input devices 14, and may also be beneficial for overall processing efficiency of the device 2 as fewer user inputs may need to be processed.

While the present disclosure is primarily described in terms of methods, a person of ordinary skill in the art will understand that the present disclosure is also directed to various apparatus such as a camera enabled device including components for performing at least some of the aspects and features of the described methods, be it by way of hardware components, software or any combination of the two, or in any other manner. Moreover, an article of manufacture for use with the apparatus may also be provided, such as a pre-recorded storage device or other similar computer readable medium including program instructions recorded thereon. It is understood that such apparatus and articles of manufacture also come within the scope of the present disclosure.

The term "computer readable medium" as used herein means any medium which can store instructions for use by or execution by a computer or other computing device including, but not limited to, a portable computer diskette, a hard disk drive (HDD), a random access memory (RAM), a read-only memory (ROM), an erasable programmable-read-only memory (EPROM) or flash memory, an optical disc such as a Compact Disc (CD), Digital Versatile Disc (DVD) or Blu-ray™ Disc, and a solid state storage device (e.g., NAND flash or synchronous dynamic RAM (SDRAM)).

The various embodiments presented above are merely examples and are in no way meant to limit the scope of this disclosure. Variations of the innovations described herein will be apparent to persons of ordinary skill in the art, such variations being within the intended scope of the present application. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A method for naming digital image data files stored on a camera enabled device having an image sensor, an audio sensor, a display and a memory, comprising:
   capturing image data through the image sensor;
   in response to capturing the image data;
   displaying, on the display, a default filename for an image data file for the captured image data, wherein the displayed default filename is selectable for editing by a user; and
   if a user input selecting the default filename is detected within a default duration from the capturing of the image data monitoring the audio sensor for voice input upon, and determining a new filename for the image data file in dependence on a text translation of the voice input.

2. The method of claim 1 wherein displaying the default filename occurs immediately after capturing the image data.

3. The method of claim 1 wherein the image data file is stored in the memory using the new filename.

4. The method of claim 1 wherein the default filename is derived from a previously voice inputted filename with an identifier added to the previously voice inputted filename.

5. The method of claim 1 wherein determining the new filename comprises determining one or more text strings as possible matches for the voice input, presenting the one or more text strings, monitoring for user action indicating selection of one of the one or more text strings, and deriving the new filename in dependence on the user selected text string.

6. The method of claim 5 wherein determining one or more text strings as possible matches for the voice input comprises comparing the voice input with a dictionary of text strings stored in the memory.

7. The method of claim 1 wherein determining the new filename comprises determining whether the voice input matches a previously used filename and if so, adding an identifier to a text string derived from the voice input for use as the filename.

8. The method of claim 7 wherein the identifier comprises any one of a sequential identifier, a date stamp and a time stamp.

9. The method of claim 1 comprising receiving further voice input through the audio sensor and determining a folder name in dependence on a text translation of the further voice input wherein the image data file is stored in the memory using a folder having the folder name.

10. A camera enabled device comprising:
    an image sensor for capturing image data;
    a memory for storing image data files corresponding to captured image data;
    an audio sensor for receiving voice input;
    a display;
    a user input device;
    a processor coupled to the memory, image sensor, audio sensor, display, and user input device, wherein the processor is configured to:
    capture image data using the image sensor, and in response to capturing the image data, to;
    display on the display a default filename for an image data file for the image data, wherein the displayed default filename is selectable for editing by a user; and
    if the user input device detects input selecting the default filename within a default duration from the capturing of the image data is captured, activate the audio sensor to receive voice input, determine a new filename in dependence on a text translation of the voice input and use the new filename to identify the image data file in the memory.

11. The camera enabled device of claim 10 wherein the device is enabled for wireless voice and data communications.

12. A method for organizing digital image data files stored on a camera enabled device having an image sensor, an audio sensor, a display and a memory, comprising:
    enabling an image capture mode;
    in response to enabling the image. capture mode;
    displaying a default folder name on the display for storing an image data file, wherein the displayed default folder name is selectable for editing by a user;

receiving a selection input indicating that the displayed default folder name displayed on the display has been selected; and in response to receiving the selection input, receiving voice input through the audio sensor, determining a folder name in dependence on a text translation of the voice input and saving a captured image data file in the memory using a folder having the folder name.

13. The method of claim 12 comprising, prior to receiving the voice input, issuing a prompt through the camera enabled device for a user to speak a folder name.

14. The method of claim 13 wherein the prompt is issued subsequent to receiving the selection input.

15. The method of claim 12 comprising using a filename for the image data file that is derived from the folder name and one or more of a sequential identifier, a time stamp and a date stamp.

16. The method of claim 12 comprising receiving further voice input through the audio sensor and determining a filename for the image data file in dependence on a text translation of the further voice input.

17. The method of claim 16 comprising, after image data is captured using the image sensor, automatically display on the display a default filename for an image data file for the image data; and upon detecting input through a user input device selecting the default filename, activate the audio sensor to receive voice input, determine a new filename in dependence on a text translation of the voice input, and use the new filename to identify the image data file in the memory.

18. The method of claim 12 wherein determining the folder name comprises determining one or more text strings as possible matches for the voice input, presenting the one or more text strings, monitoring for user action indicating selection of one of one or more text strings, and deriving the folder name in dependence on the user selected text string.

19. The method of claim 18 wherein determining the folder name comprises determining if the voice input matches an existing folder name and if so, adding an identifier to at least one of the text strings derived from the voice input.

20. The method of claim 12 wherein the voice input is received prior to capturing the image date.

21. A camera enabled device comprising:

an image sensor for capturing image data;

a memory for storing image data files corresponding to captured image data;

an audio sensor for receiving voice input;

a display;

a user input device;

a processor coupled to the memory, image sensor, audio sensor, display, and user input device, wherein the processor is configured for:

enabling an image capture mode;

in response to enabling the image capture mode;

displaying a default folder name on the display for storing an image data file, wherein the displayed default folder name is selectable for editing by a user;

receiving a selection input indicating that the default folder name displayed on the display has been selected; and in response to receiving the selection input, receiving voice input through the audio sensor and determining a folder name in dependence on a text translation of the voice input and saving a captured image data file in the memory using a folder having the folder name.

* * * * *

UNITED STATES PATENT AND TRADEMARK OFFICE
CERTIFICATE OF CORRECTION

| | | |
|---|---|---|
| PATENT NO. | : 8,558,919 B2 | Page 1 of 1 |
| APPLICATION NO. | : 12/649395 | |
| DATED | : October 15, 2013 | |
| INVENTOR(S) | : Bos et al. | |

It is certified that error appears in the above-identified patent and that said Letters Patent is hereby corrected as shown below:

On the Title Page, Item (73) Assignee should read -- BlackBerry Limited. --.

In the Claims

In column 12, line 1, claim 1 should read:
-- data monitoring the audio sensor for voice input, --.

In column 13, line 25, claim 17 should read:
-- display a user-editable default filename for an image data file for the image --.

Signed and Sealed this
Sixth Day of May, 2014

Michelle K. Lee
*Deputy Director of the United States Patent and Trademark Office*